United States Patent
Frondoni

(10) Patent No.: US 11,144,896 B1
(45) Date of Patent: Oct. 12, 2021

(54) IMAGE APPLIANCE VEHICLE TOLL TRANSACTION SYSTEM AND METHOD FOR IDENTIFYING A VEHICLE AT AN ELECTRONIC TOLL FOR ELECTRONIC TOLL COLLECTION

(71) Applicant: Giorgio Salvatore Frondoni, Carlsbad, CA (US)

(72) Inventor: Giorgio Salvatore Frondoni, Carlsbad, CA (US)

(73) Assignee: Giorgio Salvatore Frondoni, Carlsbad, CA (US)

( * ) Notice: Subject to any disclaimer, the term of this patent is extended or adjusted under 35 U.S.C. 154(b) by 473 days.

(21) Appl. No.: 16/036,289

(22) Filed: Jul. 16, 2018

Related U.S. Application Data

(60) Provisional application No. 62/532,835, filed on Jul. 14, 2017.

(51) Int. Cl.
| | |
|---|---|
| *G06K 19/14* | (2006.01) |
| *G06Q 20/14* | (2012.01) |
| *G06Q 50/30* | (2012.01) |
| *G06K 9/32* | (2006.01) |
| *G08G 1/017* | (2006.01) |

(52) U.S. Cl.
CPC ........... *G06Q 20/145* (2013.01); *G06K 9/325* (2013.01); *G06Q 50/30* (2013.01); *G08G 1/0175* (2013.01)

(58) Field of Classification Search
CPC ...... G06Q 20/145; G06Q 50/30; G06K 9/325; G08G 1/0175
See application file for complete search history.

(56) References Cited

U.S. PATENT DOCUMENTS

| | | | |
|---|---|---|---|
| 8,644,561 B2 | 2/2014 | Burry | |
| 9,092,979 B2 | 7/2015 | Burry | |
| 2004/0167861 A1* | 8/2004 | Hedley | G06K 9/00624 705/400 |
| 2006/0278705 A1* | 12/2006 | Hedley | G07B 15/063 235/384 |
| 2013/0006725 A1* | 1/2013 | Simanek | G07B 15/063 705/13 |
| 2016/0004936 A1* | 1/2016 | Sawney | G06K 9/6253 382/159 |

OTHER PUBLICATIONS

Automatic Toll Collection System Using RFID by International Journal of Computer Science and Mobile Computing (Year: 2016).*
Automatic Toll Collection System Using RFID by Journal of Computer Science and Mobile Computing (Year: 2016).*

* cited by examiner

*Primary Examiner* — Zeina Elchanti
(74) *Attorney, Agent, or Firm* — Plager Schack LLP

(57) ABSTRACT

An image appliance vehicle toll transaction system for electronic toll collection and image appliance vehicle toll transaction methods for identifying a vehicle at an electronic toll for electronic toll collection are disclosed. The image appliance vehicle toll transaction system allows toll agencies to store, in a cloud database, images of vehicle toll transactions and violations for the time required by the law and their data associated image metadata. The image appliance vehicle toll transaction system may use third party services to automatically determine, using AI, the license plate number and state of the vehicle. For each received image, and its metadata, the system returns a unique identifier or image token. This reduces the need for human manual image review by using AI and reduces operation costs while increasing accuracy and quality.

10 Claims, 6 Drawing Sheets

IMAGE APPLIANCE VEHICLE TOLL TRANSACTION SYSTEM AND METHOD FOR IDENTIFYING A VEHICLE AT AN ELECTRONIC TOLL FOR ELECTRONIC TOLL COLLECTION

CLAIM OF BENEFIT TO PRIOR APPLICATION

This application claims benefit to U.S. Provisional Patent Application 62/532,835, entitled "IMAGE APPLIANCE SYSTEM AND METHOD FOR ELECTRONIC TOLL COLLECTION," filed Jul. 14, 2017. The U.S. Provisional Patent Application 62/532,835 is incorporated herein by reference.

BACKGROUND

Embodiments of the invention described in this specification relate generally to electronic vehicular toll systems, and more specifically, to an image appliance vehicle toll transaction system for electronic toll collection and an image appliance vehicle toll transaction method for identifying a vehicle at an electronic toll.

Toll operation costs are high despite the ongoing conversion to electronic toll collection systems. This is a problem because one advantage of electronic toll collection is reduced costs due to the reduction in labor. However, electronic toll collection requires other components which manual toll systems did not rely on, namely, high quality cameras and the ability to store images of vehicles passing through electronic toll gates, in addition to the regular maintenance costs for complex data systems and regulatory compliance. One issue with labor is that instead of toll booth operators, image review personnel are needed to review the images of vehicles passing through electronic toll gates. Furthermore, an extensive amount of electronic data storage is required to retain digital image files, thereby increasing costs even more.

Optical character recognition software has been tried, but there are problems with OCR. To compensate the OCR deficiency, the manual image review has high cost, due to labor, turnover, training cost and accuracy. This has forced the industry to outsource the manual image review to reduce the cost per hour, but does not improve accuracy and quality.

Thus, the problems come to down to image storage and image recognition issues. In particular, the issue that makes image storage a problem is the fact that storing images locally requires data migration due to computer hardware upgrades and maintenance, as well as continued capital investment in storage because image retention requirements are longer than average storage life. The issue that makes image recognition a problem is that manual review is expensive, even when reductions in manual toll booth operators are accounted for.

Therefore, what is needed is a way for toll agencies to only have to store an image token and use that token for further access to the image stored in a cloud-based image appliance system, thereby replacing human manual review to the maximum extent possible by using artificial intelligence (AI) to reduce operation costs and increase accuracy and quality.

BRIEF DESCRIPTION

A novel image appliance vehicle toll transaction system for electronic toll collection and image appliance vehicle toll transaction methods for identifying a vehicle at an electronic toll for electronic toll collection are disclosed. In some embodiments, the image appliance vehicle toll transaction methods for identifying a vehicle at an electronic toll comprise a high level image appliance vehicle toll transaction method and a detailed image appliance vehicle toll transaction method. In some embodiments, the detailed image appliance vehicle toll transaction method is performed by an image appliance, an image service, and a storage service associated with the image appliance vehicle toll transaction system.

In some embodiments, the image appliance vehicle toll transaction system allows toll agencies to store, in one or more image appliances of a cloud database management system, images of vehicle toll transactions, electronic toll violations, and associated data and metadata for a time permitted under the law. In some embodiments, the image appliance vehicle toll transaction system uses third party services to automatically determine, using AI, a license plate number and a state (or jurisdictional region) of a vehicle passing through an electronic vehicular toll. In some embodiments, the image appliance vehicle toll transaction system obtains an image of the vehicle by one of capturing the image of the vehicle as it passes through the electronic vehicular toll and receiving the image of the vehicle as it passes through the electronic vehicular toll from a toll agency system (hereinafter referred to as "toll agency system" or "toll agency") associated with the electronic vehicular toll. In some embodiments, the image appliance vehicle toll transaction system returns a unique identifier or token for each image an associated metadata of a vehicle passing through an electronic vehicular toll.

In some embodiments, the high level image appliance vehicle toll transaction method includes a plurality of steps for identifying a vehicle at an electronic toll comprising a first step at which a customer client sends an image file, associated image metadata, and a command (that specify one or more instructions) to an image appliance of the image appliance vehicle toll transaction system, a second step at which the image appliance returns a unique request identifier (ID) to the customer client, a third step at which the image appliance forwards the image file and the associated image metadata to an image service of the image appliance vehicle toll transaction system, a fourth step at which the image service forwards the image file and the associated image metadata to a storage service (an image storage service), a fifth step at which the storage service stores the image file and the associated image metadata in a cloud database storage and returns a unique image token to the image service, an optional sixth step at which the image service performs image recognition processes in view of the image and obtains an image recognition result, a seventh step at which the image service returns image tokens (and, when the image service obtained an image recognition result, returns the image recognition result with the tokens) to the image appliance, and an eighth step at which the image appliance returns the image tokens (and, when the image appliance received an image recognition result from the image service, returns the image recognition result with the tokens) to the customer client associated with the unique request ID.

In some embodiments, the detailed image appliance vehicle toll transaction method for identifying a vehicle at an electronic toll is performed by an image appliance, an image service, and a storage service associated with the image appliance vehicle toll transaction system. In some embodiments, the image appliance vehicle toll transaction method comprises (i) receiving, at an image appliance of a corresponding image service, an image of a vehicle at an electronic toll and associated metadata from a toll agency system, (ii) sending, by the image appliance, a unique request ID to the toll agency system, (iii) storing, by the image appliance, the unique request ID in a first persistent storage, (iv) forwarding, by the image appliance, the image and associated metadata to the corresponding image service, (v) sending, by the corresponding image service, the image to a storage service associated with the corresponding image service, (vi) storing, by the storage service, the image in a second persistent storage, (vii) creating, by the storage service, a unique token, (viii) sending, by the storage service, the unique token to the corresponding image service, (ix) receiving, by the corresponding image service, the unique token from the storage service, (x) sending, by the corresponding image service, the associated metadata to the storage service, (xi) receiving, by the storage service, the associated metadata from the corresponding image service, (xii) creating, by the storage service, an image record with the unique token, a storage location of the image in the second persistent storage, and the associated metadata, (xiii) storing, by the storage service, the image record in the second persistent storage, (xiv) sending, by the storage service, an acknowledgment to the corresponding image service, (xv) sending, by the corresponding image service, the image to an image recognition service (third party image recognition service), (xvi) receiving, by the corresponding image service, a vehicle recognition result with at least a license plate identification and a confidence level from the image recognition service, (xvii) sending, by the corresponding image service, the vehicle recognition result (the license plate identification and the confidence level) to the storage service, (xviii) receiving, by the storage service, the vehicle recognition result (the license plate identification and the confidence level) from the corresponding image service, (xix) updating, by the storage service, the image record to include the vehicle recognition result (the license plate identification and the confidence level), (xx) sending, by the storage service, an acknowledgment to the corresponding image service, (xxi) sending, by the corresponding image service, the unique token and the vehicle recognition result (the license plate identification and the confidence level) to the image appliance, (xxii) correlating, by the image appliance, the unique request ID to at least the unique token and (optionally also) to the vehicle recognition result (the license plate identification and the confidence level), (xxiii) sending, by the image appliance, the unique request ID and correlated unique token and the vehicle recognition result (the license plate identification and the confidence level) to the toll agency system, (xxiv) sending, by the image appliance, details of the unique request ID including image file size and confidence level of vehicle recognition result to a billing invoice system of the image appliance vehicle toll transaction system to allow the billing invoice system to collect and aggregate data related to the unique request ID and to issue monthly invoices for payment of electronic toll amounts to an owner of the vehicle.

In some embodiments, each of the high level image appliance vehicle toll transaction method and the detailed image appliance vehicle toll transaction method is implemented as a cloud-based image service software application that runs on an image appliance toll transaction platform hosted on a web server of a cloud-based image appliance vehicle toll transaction system that is accessed over a network by toll agency client computing devices for toll collection activities. In some embodiments, the network is a hybrid Internet-based network comprising public cloud computing resources accessed over the public Internet and private cloud computing resources accessed over private cloud networks, including encrypted and virtual private networks.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
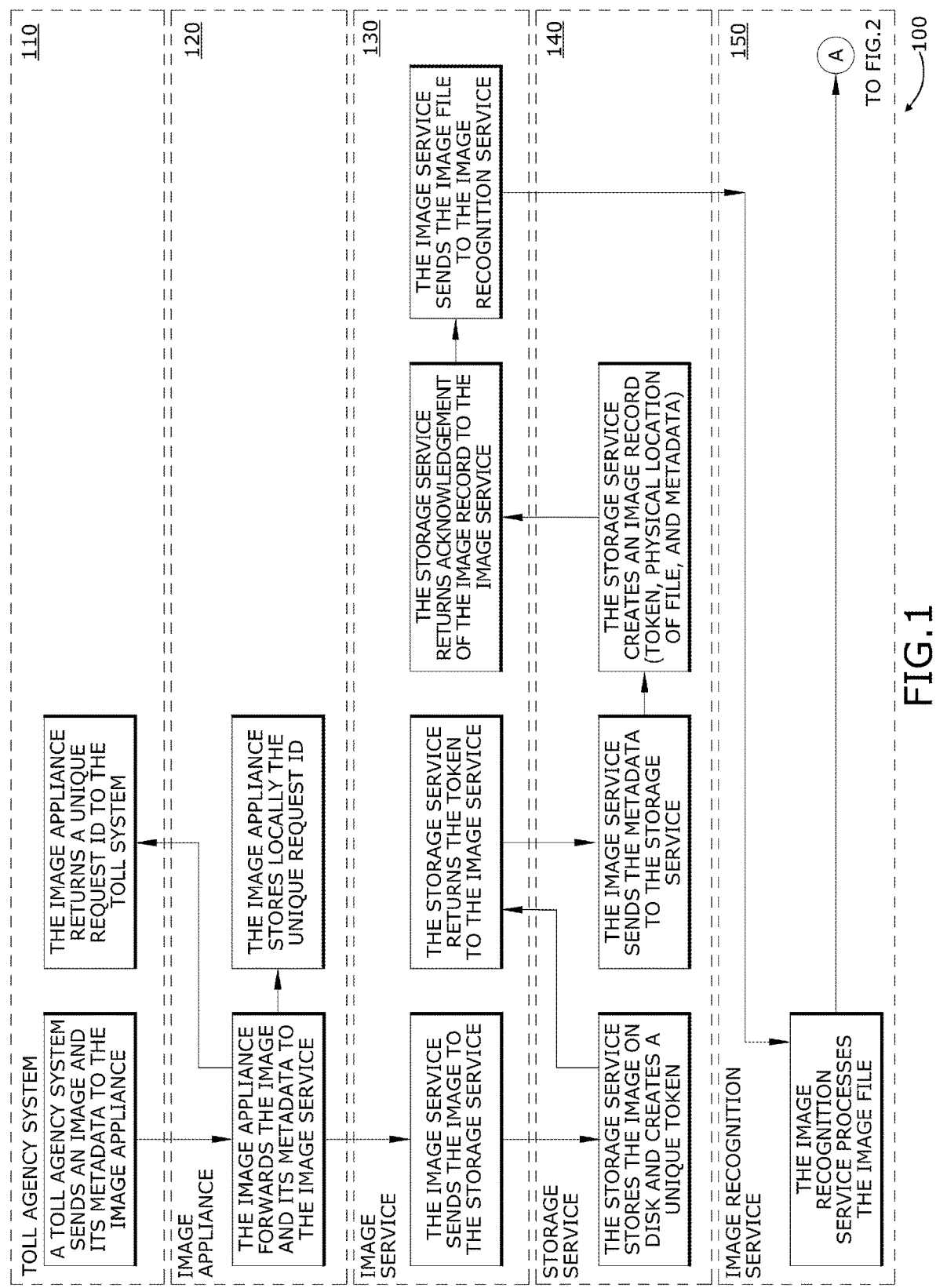

Having thus described the invention in general terms, reference is now made to the accompanying drawings, which are not necessarily drawn to scale, and which show different views of different example embodiments, and wherein:

FIG. 1 conceptually illustrates an image appliance vehicle toll transaction system in some embodiments.

Figure 2:
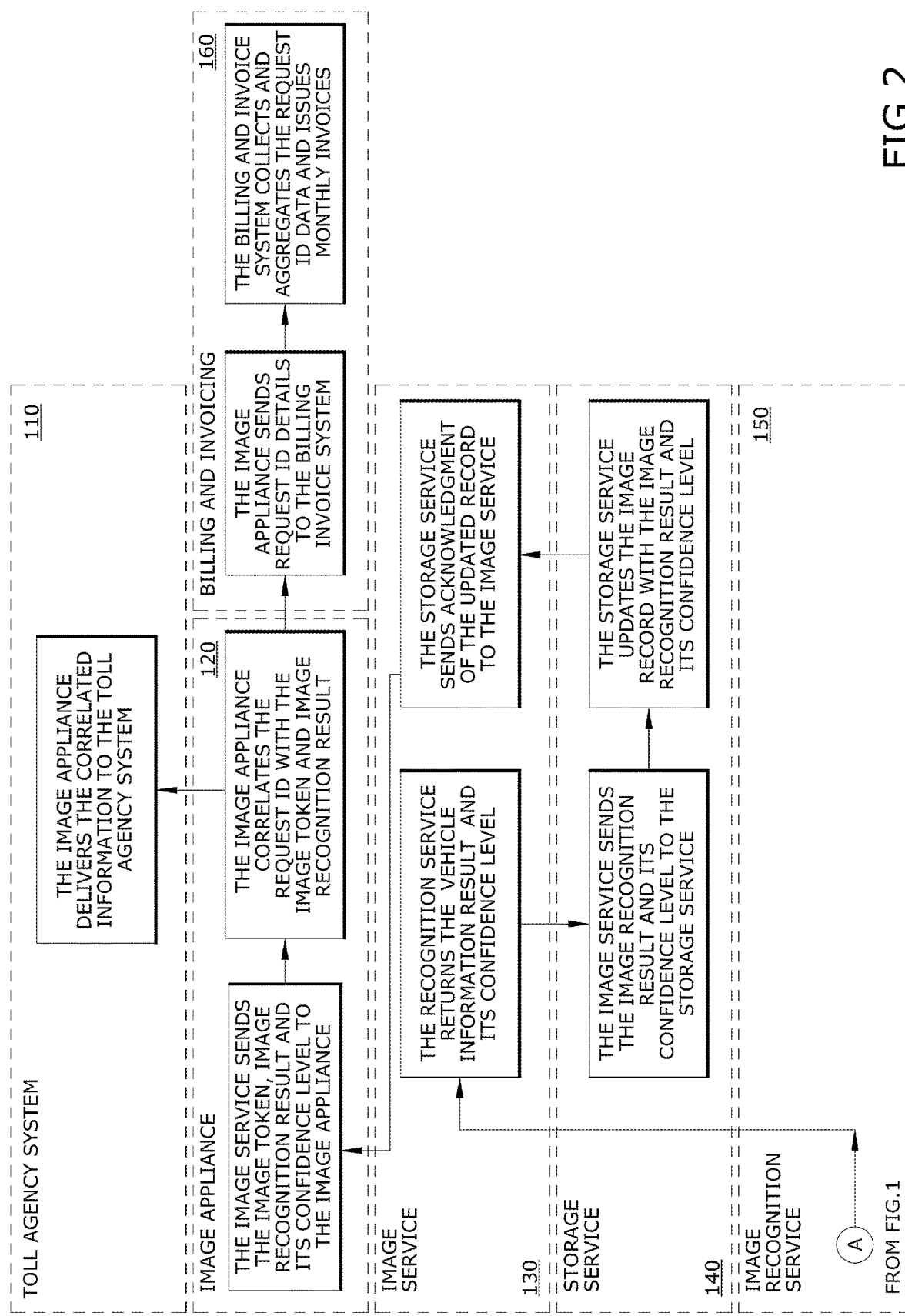

FIG. 2 conceptually illustrates a continuation of the image appliance vehicle toll transaction system of FIG. 1.

Figure 3:
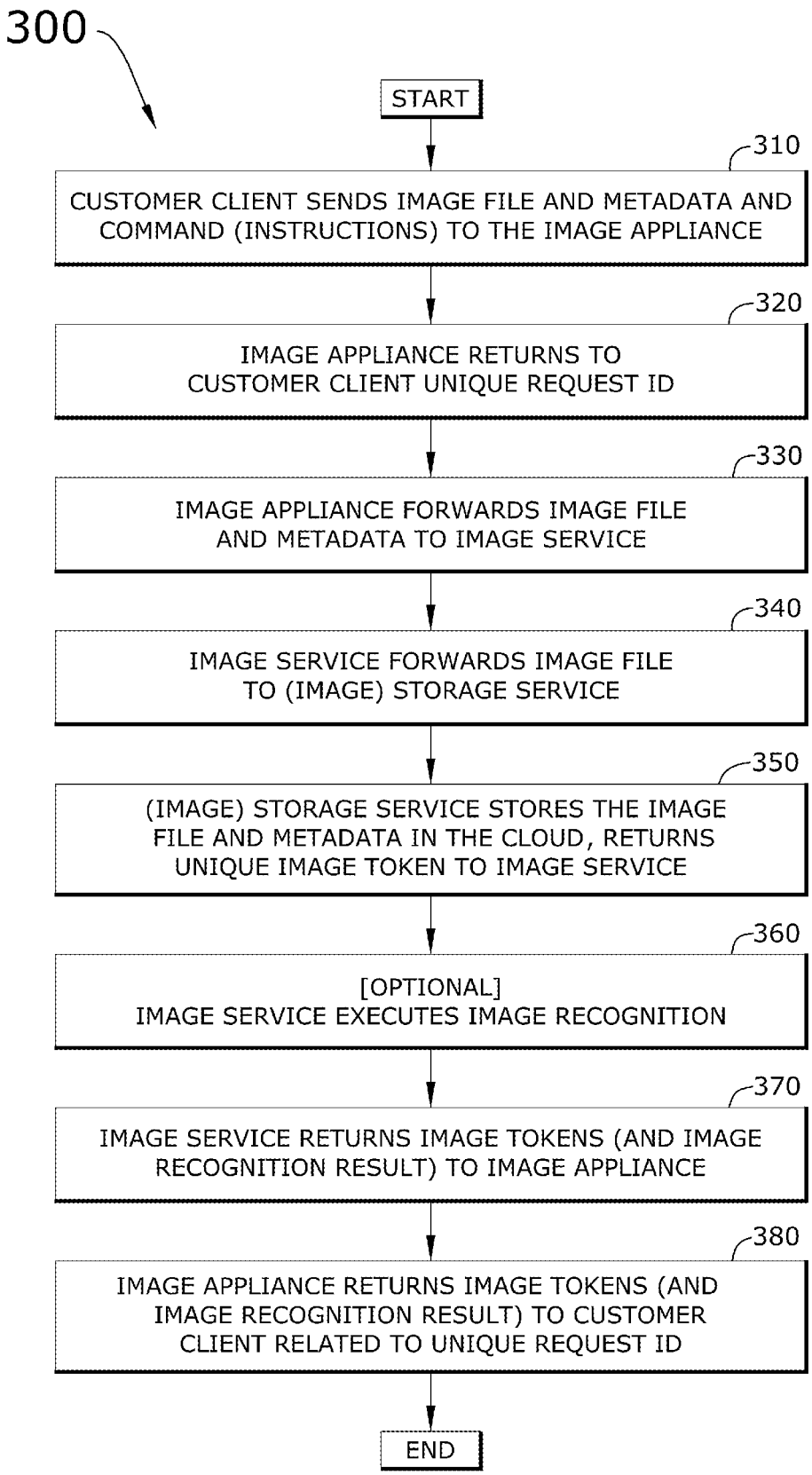

FIG. 3 conceptually illustrates a high level image appliance vehicle toll transaction method in some embodiments.

Figure 4:
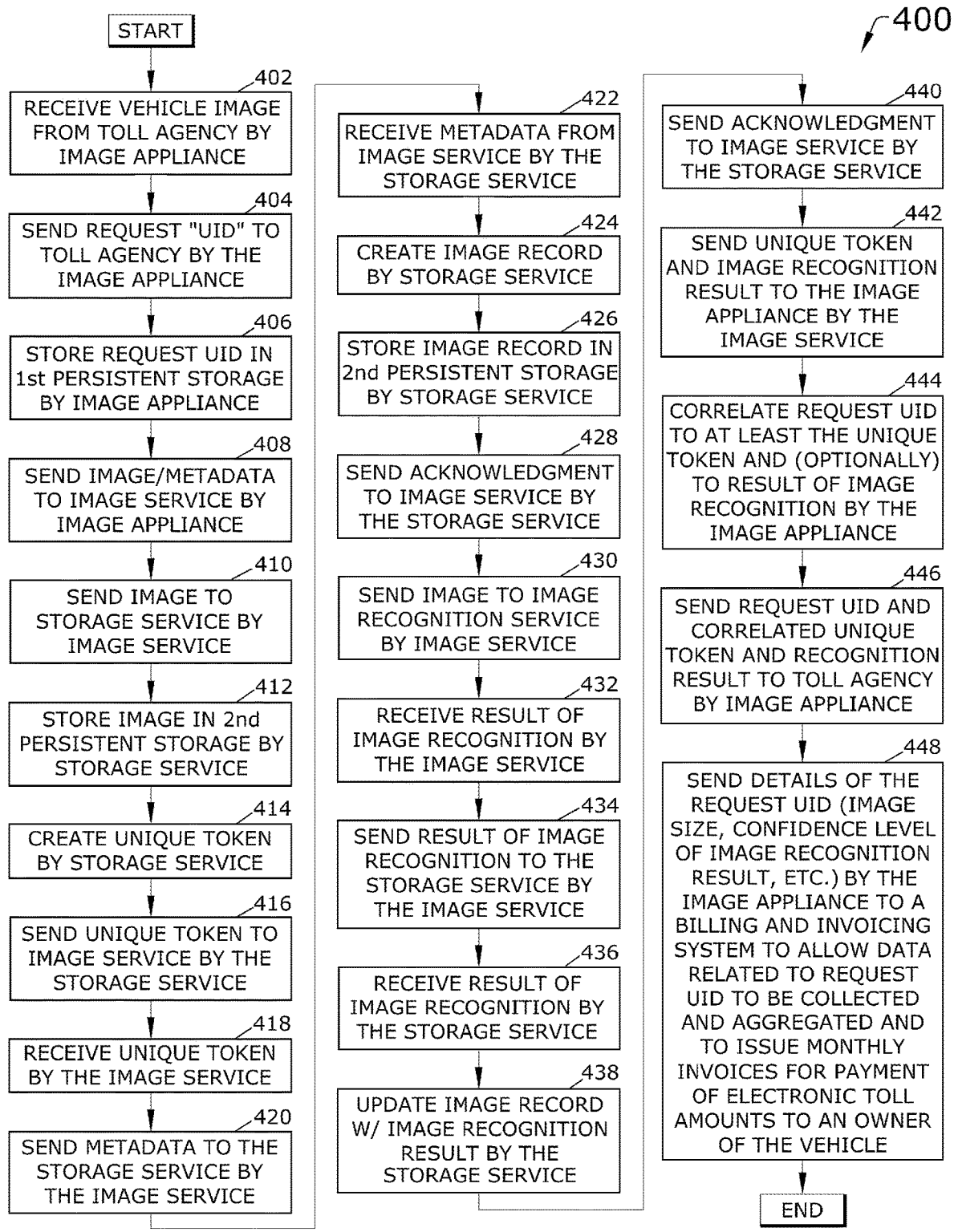

FIG. 4 conceptually illustrates a detailed image appliance vehicle toll transaction method for identifying a vehicle at an electronic toll for electronic toll collection in some embodiments.

Figure 5:
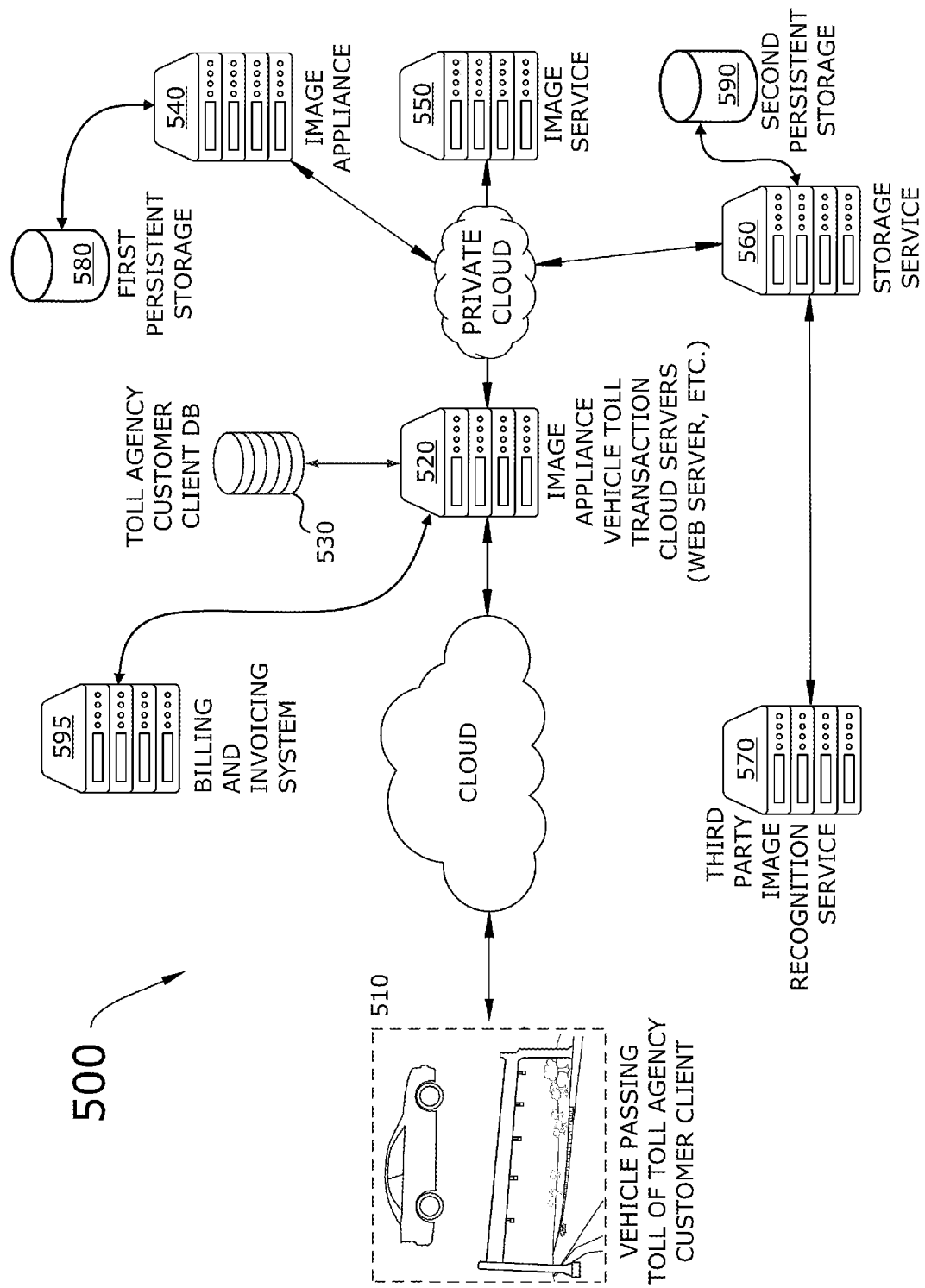

FIG. 5 conceptually illustrates a network architecture of an image appliance vehicle toll transaction system in some embodiments.

Figure 6:
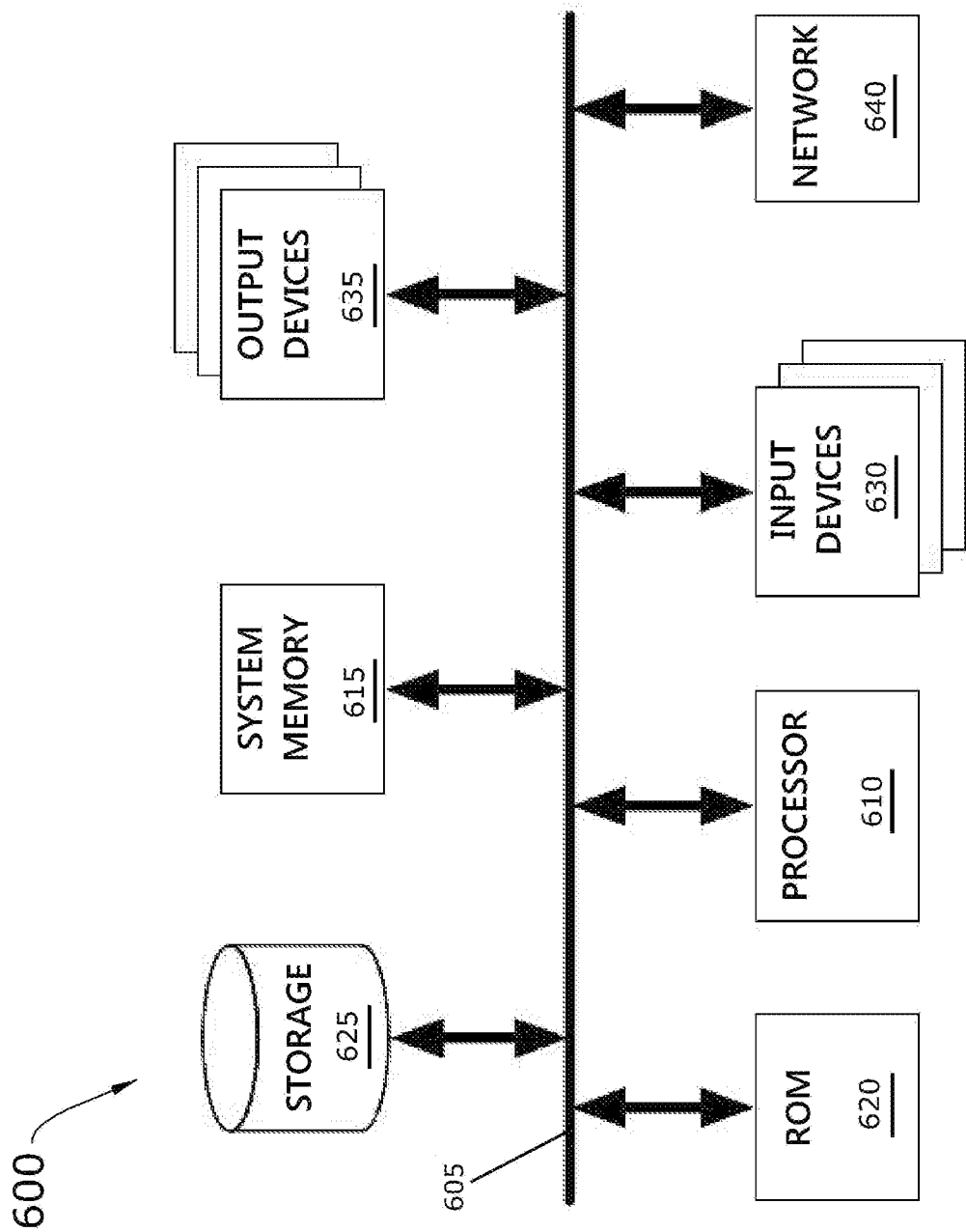

FIG. 6 conceptually illustrates an electronic system with which some embodiments of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel image appliance vehicle toll transaction system for electronic toll collection and image appliance vehicle toll transaction methods for identifying a vehicle at an electronic toll for electronic toll collection.

In some embodiments, the image appliance vehicle toll transaction system and methods for identifying a vehicle at an electronic toll for electronic toll collection allow toll agencies to store, in a cloud database, images of vehicle toll transactions and violations for the time required by the law and their data associated (metadata). In some embodiments, the image appliance vehicle toll transaction system and methods for identifying a vehicle at an electronic toll for electronic toll collection use third party services to automatically determine, using AI, the license plate number and state of the vehicle. In some embodiments, for each received image, and its metadata, the image appliance vehicle toll transaction system and methods for identifying a vehicle at an electronic toll and for electronic toll collection return a unique identifier or token. In this way, the toll agency only needs to access a user interface which allows for storing an image token and for further access to the stored image in the image appliance vehicle toll transaction system. Furthermore, the image appliance vehicle toll transaction system and the methods for identifying a vehicle at an electronic toll for electronic toll collection replace human manual review at the maximum extent possible by using AI, thereby reducing operation costs while increasing accuracy and quality.

As stated above, toll operation costs are high despite the ongoing conversion to electronic toll collection systems. One issue with labor is that instead of toll booth operators, image review personnel are needed to review the images of vehicles passing through electronic toll gates. Also, to compensate the OCR deficiency, the manual image review has high cost, due to labor, turnover, training cost and accuracy. This has forced the industry to outsource the manual image review to reduce the cost per hour, but does not improve accuracy and quality.

Embodiments of the image appliance vehicle toll transaction system and methods for identifying a vehicle at an electronic toll for electronic toll collection described in this specification solve such problems by allowing toll agencies to store in the cloud (not on premises) images related to vehicle toll transactions and violations for the time required by the law and their data associated (defined in this document as metadata). The image appliance vehicle toll transaction system and methods for identifying a vehicle at an electronic toll for electronic toll collection also uses third party available services to automatically determine based on AI the license plate number and state of the vehicle in the images. In some embodiments, an image appliance is at the core of the image appliance vehicle toll transaction system and key actor (or performer) carrying out steps of the methods for identifying a vehicle at an electronic toll for electronic toll collection. Being at the core of the image appliance vehicle toll transaction system, the image appliance addresses two problems: (i) on premises image storage cost and maintenance complexity for regulation requirements, and (ii) reducing the need for expensive manual image review (executed by staff) by replacing it with available AI technology. For each received image and its metadata, the image appliance vehicle toll transaction system and methods for identifying a vehicle at an electronic toll for electronic toll collection return a unique identifier or token ("unique identifier" and "token" are hereinafter understood to mean the same thing, and therefore, may be both be referred to as a "token" or "unique ID"). The toll agency should store this token for any future access to the image, its metadata, and the license plate information. An image recognition service used by the toll agency evaluates a license plate number for each received image, performs character recognition, and determines a confidence level of a result. The vehicle information result from the evaluation of the license plate and its confidence level is provided to the toll agency.

Embodiments of the image appliance vehicle toll transaction system and methods for identifying a vehicle at an electronic toll for electronic toll collection described in this specification differ from and improve upon currently existing options by integrating two separate problems in one solution, including (i) long term image storage cost, maintenance and data retention regulation complexity, and (ii) reduction in required manual image review if existing OCR engine recognize image with low confidence level.

In addition, some embodiments of the image appliance vehicle toll transaction system and methods for identifying a vehicle at an electronic toll for electronic toll collection improve upon the currently existing options by providing an interface to the toll agency which only has to store an image token and use that token for any further access to the image stored in a database or data storage/repository of the image appliance vehicle toll transaction system. The second part is the replacement of human manual review at the maximum extent possible by using AI. This reduce operation costs and increase accuracy and quality.

Some embodiments of the image appliance vehicle toll transaction system and methods for identifying a vehicle at an electronic toll for electronic toll collection can be adapted for application to any field where a large number of images files must be stored for a long period of time per regulation requirements. The aspect of image recognition is optional in the sense that it may or may not be used or replaced with different scope based on the application (e.g., people's faces, locations, scanned documents, etc.).

Several more detailed embodiments of the sales tax audit system and process are described below. Section I describes an image appliance vehicle toll transaction system. Section II describes high level and detailed image appliance vehicle toll methods for identifying vehicles at electronic tolls for electronic toll collection. Section III describes a network architecture of a cloud-based image appliance vehicle toll transaction system. Lastly, Section IV describes an electronic system that implements some embodiments of the invention.

I. Image Appliance Vehicle Toll Transaction System

In some embodiments, the image appliance vehicle toll transaction system allows toll agencies to store, in one or more image appliances of a cloud database management system, images of vehicle toll transactions, electronic toll violations, and associated data and metadata for a time permitted under the law. In some embodiments, the image appliance vehicle toll transaction system uses third party services to automatically determine, using AI, a license plate number and a state (or jurisdictional region) of a vehicle passing through an electronic vehicular toll. In some embodiments, the image appliance vehicle toll transaction system obtains an image of the vehicle by one of capturing the image of the vehicle as it passes through the electronic vehicular toll and receiving the image of the vehicle as it passes through the electronic vehicular toll from a toll agency associated with the electronic vehicular toll. In some embodiments, the image appliance vehicle toll transaction system returns a unique identifier or token to the toll agency for each image and associated image metadata of a vehicle passing through an electronic vehicular toll.

By way of example, FIGS. 1 and 2 conceptually illustrate an image appliance vehicle toll transaction system 100. The image appliance vehicle toll transaction system 100 may be comprised of the following elements. This list of possible constituent elements is intended to be exemplary only and it is not intended that this list be used to limit the image appliance vehicle toll transaction system 100 to just these elements. Persons having ordinary skill in the art relevant to the present disclosure may understand there to be equivalent elements that may be substituted within the present disclosure without changing the essential function or operation of the image appliance vehicle toll transaction system 100.

Specifically, the image appliance vehicle toll transaction system 100 shown in these figures includes a toll agency system 110, an image appliance 120, an image service 130, a storage service 140, an image recognition service 150, and a billing and invoicing system 160 (as shown only in FIG. 2). In some embodiments, the toll agency system 110 is a third party system that is outside of the image appliance vehicle toll transaction system 100. In some embodiments, the toll agency system 110 interacts with the image appliance vehicle toll transaction system 100 to identify a vehicle at an electronic toll and to bill and collect the electronic toll from a user of the vehicle at the electronic toll. In some embodiments, the image recognition service 150 is a service hosted by a third party system that is outside of the image appliance vehicle toll transaction system 100.

In some embodiments, the image appliance vehicle toll transaction system 100 performs several operations by way of the image appliance 120, the image service 130, and the storage service 140, and by interactions with the toll agency system 110 and the image recognition service 150. Specifically, and referring first to FIG. 1, the toll agency system 110 sends an image and its metadata to the image appliance 120 and receives a unique request ID back from the image appliance 120. The image appliance 120 forwards the image and its metadata to the image service 130. The image appliance 120 also stores the unique request ID locally. For instance, the image appliance 120 may store the unique request ID on a local storage device of the image appliance 120. In turn, the image service 130 sends the image to the storage service 140, which stores the image on disk. The storage service 140 also creates a unique image token and returns it to the image service 130. The image service 130 then sends the metadata to the storage service 140. In some embodiments, the image service 130 sends the metadata to the storage service 140 after receiving the unique image token from the storage service 140.

In some embodiments, the storage service 140 stores the unique image token, a physical location of the image file, and metadata in a database. In some embodiments, the storage service 140 creates an image record that references each of the unique image token, the physical location, and the metadata. In some embodiments, the storage service 140 stores the image record in the database and then returns an acknowledgment to the image service 130. After receiving the acknowledgment, the image service 130 sends the image file to the image recognition service 150. The image recognition service 150 then sends a result (vehicle information result, such as license plate) and a confidence level back to the image service 130.

Turning to FIG. 2, as shown, the image service 130 receives the vehicle information result (license plate) and its confidence level from the image recognition service 150. Then the image service 130 sends the image recognition result and its confidence level to the storage service 140. The storage service 140, in turn, updates the image record with the image recognition result and its confidence level and sends an acknowledgment that the record was updated to the image service 130. Upon receiving the acknowledgment of the updated record, the image service 130 sends the image token, the image recognition result and its confidence level to the image appliance 120, which correlates the unique request ID with the image token and the image recognition result. The image appliance 120 then delivers the correlated unique request ID, the image token, and the image recognition result to the toll agency system 110.

In some embodiments, the image appliance 120 contemporaneously sends details associated with the unique request ID to the billing and invoicing system 160. In some embodiments, the unique request ID details sent to the billing and invoicing system 160 include a file size of the image file and the confidence level of the image recognition. At this point, the billing and invoicing system 160 collects and aggregates the details of the unique request ID data and issues monthly invoices.

In some embodiments, the image appliance vehicle toll transaction system 100 generally works by the toll agency system 110 establishing a secure connection via the Internet to send an image file and its metadata to the image appliance 120. The image appliance 120, in response, returns a unique request ID to the toll agency system 110. The manner of obtaining data related to the unique request ID by the toll agency system 110 can be synchronous or asynchronous. As such, the toll agency system 110 can wait synchronously until the unique request ID data is returned (synchronous method) or check later (asynchronous method). Meanwhile, the image appliance 120 dispatches the request to store the image file, store its metadata, request recognition of the image, create an image token and create an image record. Once the data is available, the image appliance 120 sends to the toll agency system 110 the token, the image recognition result, and its confidence level related to the initial unique request ID. At successful completion of the request delivery, the image appliance 120 sends the unique request ID details (e.g., image file size, image recognition result, and confidence level) to the billing and invoicing system 160. Periodically (e.g., once a month), the billing and invoicing system 160 aggregates and summarizes all the requests completed in the defined period to create and issue an invoice.

To make the image appliance vehicle toll transaction system 100 of the present disclosure, a person may define the protocol interface between the toll agency system 110 and the image appliance 120. In some embodiments, the image appliance vehicle toll transaction system 100 encrypts all data transmitted between the toll agency system 110, the image appliance 120, the image service 130, the storage service 140, the image recognition service 150, and the billing and invoicing system 160. By encrypting the data, the image appliance vehicle toll transaction system 100 provides enhanced security and privacy of personal information. In some embodiments, the image appliance vehicle toll transaction system 100 encrypts data by an encryption data transfer protocol, such as HTTPS or SSL over the Internet. In some embodiments, the image appliance vehicle toll transaction system 100 encrypts source data (including, e.g., data files, data structures, and other data containers the encapsulate the data transmitted by and throughout the image appliance vehicle toll transaction system 100). In some embodiments, encryption of the source data is completed by data encryption techniques, such as a secure hash algorithm-based encryption (e.g., SHA-1, SHA-2, etc.), and other such encryption techniques.

In some embodiments, the image appliance vehicle toll transaction system 100 is a cloud computing network-based system. In some embodiments, the image appliance vehicle toll transaction system 100 includes cloud-based services offered by a commercial cloud computing provider (e.g., Amazon Web Services from Amazon or Azure from Microsoft) to store images files and create image records. In some embodiments, the image appliance vehicle toll transaction system 100 includes an interface (including, without limitation, a graphical user interface (GUI) of a webpage, an API-based interface, a command-line interface, etc.) that allows one to interact with the image recognition service 150 as a third party system to send the image file and receive the image recognition data. Finally, at completion of each request it is possible to send a message to the billing and invoicing system 160. The image appliance vehicle toll transaction system 100 can include one or more software applications which may implement the image appliance vehicle toll transaction methods and may be written in any commonly used computer language such as Java and C#.

In some embodiments, the image appliance vehicle toll transaction system 100 includes a component and sub-unit monitoring system that reconciles all unique request IDs thru their life cycles and adds retry logic for any of the operations and interactions between the various components and sub-units of the image appliance vehicle toll transaction system 100, as well as for the third party systems and services, to check for system failures and defaults, should any failure, default, or other problematic situation occur.

To use the image appliance vehicle toll transaction system 100 of the present disclosure, a person with adequate IT knowledge will need to receive and implement the specification of an image appliance interface control document (ICD) on the toll agency system 110. The ICD of the image appliance 120 explains how to send image files and metadata to the image appliance 120 and how to receive the token and the image recognition result and its confidence level. In addition, the ICD describes how to get an image record via the token and how to permanently remove an image and its image record from the storage.

II. Image Appliance Vehicle Toll Transaction Methods

In some embodiments, the image appliance vehicle toll transaction methods for identifying a vehicle at an electronic toll for electronic toll collection comprise a high level image appliance vehicle toll transaction method and a detailed image appliance vehicle toll transaction method.

In some embodiments, the high level image appliance vehicle toll transaction method includes a plurality of steps for identifying a vehicle at an electronic toll comprising a first step at which a customer client sends an image file, associated image metadata, and a command (that specifies one or more instructions) to an image appliance of the image appliance vehicle toll transaction system, a second step at which the image appliance returns a unique request identifier (ID) to the customer client, a third step at which the image appliance forwards the image file and the associated image metadata to an image service of the image appliance vehicle toll transaction system, a fourth step at which the image service forwards the image file and the associated image metadata to a storage service (an image storage service), a fifth step at which the storage service stores the image file and the associated image metadata in a cloud database storage and returns a unique image token to the image service, an optional sixth step at which the image service performs image recognition processes in view of the image and obtains an image recognition result, a seventh step at which the image service returns image tokens (and, when the image service obtained an image recognition result, returns the image recognition result with the tokens) to the image appliance, and an eighth step at which the image appliance returns the image tokens (and, when the image appliance received an image recognition result from the image service, returns the image recognition result with the tokens) to the customer client associated with the unique request ID.

In some embodiments, an image provided by a customer client, such as a toll agency, conforms to an Interface Control Document (ICD). In some embodiments, an ICD is used to specify requirements for image uploading by users (toll agency customer clients or systems), where a user (toll agency customer client or system) sends an image with associated metadata and a command and where a token is returned related to one of (i) getting the image and metadata, (ii) updating metadata of a recognized image stored in the image appliance system, or (iii) deleting the image and metadata from the image appliance system. The command may include instructions to store the user-provided image or recognize the image. For example, a toll agency system may capture a new image of a vehicle passing through a toll, and then provide the image with a command to store the new image in an image appliance or storage service of the image appliance vehicle toll transaction system. As another example, the toll agency system may provide an image and specify a command to recognize any image previously stored in an image appliance or storage service of the image appliance vehicle toll transaction system.

By way of example, FIG. 3 conceptually illustrates a high level image appliance vehicle toll transaction method 300. As shown in this figure, the high level image appliance vehicle toll transaction method 300 starts when a customer client sends (at 310) an image file and associated image metadata, as well as a command to an image appliance. The customer client can be a toll agency, such as the toll agency system 110 of the image appliance vehicle toll transaction system 100 described above by reference to FIGS. 1 and 2. The manner of providing the image file is specified in an associated Interface Control Document (ICD), and images that are intended to be uploaded outside of the ICD framework are denied access, and therefore, not received. In some embodiments, the command provided by the customer client refers to the type of operation needed, e.g., getting the image/metadata, recognizing an image and associated image metadata, updating an existing image/metadata or storing a new image/metadata, or deleting existing image and metadata.

In some embodiments, the high level image appliance vehicle toll transaction method 300 continues to the next step during which the image appliance returns (at 320) a unique request ID to the customer client. During the next step of the high level image appliance vehicle toll transaction method 300, the image appliance forwards the image file and image metadata (at 330) to an image service image. The image service can be a cloud-based image service, such as the image service 120 of the appliance vehicle toll transaction system 100 described above by reference to FIGS. 1 and 2.

In some embodiments, the high level image appliance vehicle toll transaction method 300 continues to the next step during which the image service forwards the image file and image metadata (at 340) to an image storage service. The image storage service then stores (at 350) the image file and the image metadata in a cloud database and returns a unique image token to the image service.

In some embodiments, the high level image appliance vehicle toll transaction method 300 optionally performs the next step during which the image service performs image recognition (at 360) in relation to the image. In some embodiments, when the high level image appliance vehicle toll transaction method 300 skips the optional image recognition step (at 360), then the high level image appliance vehicle toll transaction method 300 continues to the next step during which the image service returns (only) image tokens (at 370) to the image appliance. On the other hand, when the high level image appliance vehicle toll transaction method 300 performs the image recognition step (at 360), then the high level image appliance vehicle toll transaction method 300 returns image tokens and the image recognition result to the image appliance.

In some embodiments, the high level image appliance vehicle toll transaction method 300 continues to the next step during which the image appliance returns (at 380) either the image tokens only (when the high level image appliance vehicle toll transaction method 300 does not perform image recognition) to the customer client related to the unique request ID or returns the image tokens and the image recognition result to the customer client related to the unique request ID. Then the high level image appliance vehicle toll transaction method 300 ends.

While the high level image appliance vehicle toll transaction method 300 describes steps in general which are performed by the image appliance vehicle toll transaction system, a detailed image appliance vehicle toll transaction method describes detailed steps performed by the individual actors (e.g., components, sub-systems, or units) of the image appliance vehicle toll transaction system. Specifically, the detailed image appliance vehicle toll transaction method in some embodiments is performed by an image appliance, an image service, and a storage service associated with the image appliance vehicle toll transaction system.

By way of example, FIG. 4 conceptually illustrates a detailed image appliance vehicle toll transaction method 400 for identifying a vehicle at an electronic toll for electronic toll collection. As shown in this figure, the detailed image appliance vehicle toll transaction method 400 starts by receiving, at an image appliance of a corresponding image service, an image of a vehicle at an electronic toll and associated metadata from a toll agency system (at 402). As noted above, the image file (in which the image content of the vehicle is encoded) conforms to an Interface Control Document (ICD) which the image appliance requires for acceptable uploaded of images and associated image metadata, with further elaboration of types of acceptable commands (e.g., get image/metadata, update or store image/metadata, recognize image, delete image/metadata, etc.).

Next, the detailed image appliance vehicle toll transaction method 400 sends (at 404), by way of the image appliance, a unique request ID (or "request UID") to the toll agency system. The unique request ID links the image/metadata, as well as the command, to the image-providing toll agency customer client.

In some embodiments, the detailed image appliance vehicle toll transaction method 400 then stores (at 406), by way of the image appliance, the unique request ID in a first persistent storage. The first persistent storage may be a persistent, non-transitory storage device that is part of the image appliance or to which the image appliance is communicably connected. In some embodiments, the first persistent storage is a cloud database storage device that is accessible to the image appliance by way of a public or private network.

After storing, the detailed image appliance vehicle toll transaction method 400 of some embodiments forwards (at 408), by way of the image appliance, the image and associated metadata to the corresponding image service. The corresponding image service performs the next step of the detailed image appliance vehicle toll transaction method 400 by sending (at 410) the image to a storage service associated with the corresponding image service.

By way of the storage service, the detailed image appliance vehicle toll transaction method 400 of some embodiments stores (at 412) the image in a second persistent storage. The second persistent storage may be a persistent, non-transitory storage device that is part of a computing device (such as a cloud server) which hosts the storage service, or may be a storage device physically part of the image appliance or to which the image appliance is communicably connected. In some cases, the second persistent storage may be the same physical storage device or logical database of the first persistent storage. Next, the detailed image appliance vehicle toll transaction method 400 creates (at 414), by way of the storage service, a unique token. The detailed image appliance vehicle toll transaction method 400 then sends (at 416), via the storage service, the unique token to the corresponding image service.

In some embodiments, the detailed image appliance vehicle toll transaction method 400 receives (at 418), at the corresponding image service, the unique token from the storage service. Then the detailed image appliance vehicle toll transaction method 400 sends (at 420), by way of the corresponding image service, the associated metadata to the storage service. At the next step of the detailed image appliance vehicle toll transaction method 400, the storage service receives (at 422) the associated metadata from the corresponding image service and then creates (at 424) an image record with the unique token, a storage location of the image in the second persistent storage, and the associated metadata. The detailed image appliance vehicle toll transaction method 400 then stores (at 426), by way of the storage service, the image record in the second persistent storage. After storing the image record, the detailed image appliance vehicle toll transaction method 400 sends (at 428), by way of the storage service, an acknowledgment to the corresponding image service. The acknowledgment is an acknowledgment of the creation and storage of the image record.

At the corresponding image service, the detailed image appliance vehicle toll transaction method 400 of some embodiments sends (at 430) the image to an image recognition service. In some embodiments, the image recognition service is a third party image recognition service. In some embodiments, the detailed image appliance vehicle toll transaction method 400 does not send the image to the image recognition service. As such, the step for sending the image to the image recognition service is an optional step of the detailed image appliance vehicle toll transaction method 400. Furthermore, other subsequent steps involving the image recognition service are optional when the detailed image appliance vehicle toll transaction method 400 does not perform the step for sending the image to the image recognition service (at 430).

On the other hand, when the detailed image appliance vehicle toll transaction method 400 sends the image to the image recognition service, such as a third party image recognition service, the intent of sending the image is to obtain a result, such as an image recognition result that provides a recognized vehicle or license plate that can be associated with an owner of the vehicle (or other responsible party). Thus, when the detailed image appliance vehicle toll transaction method 400 sends the image to the image recognition service, the next step of the detailed image appliance vehicle toll transaction method 400 is to receive (at 432), by the corresponding image service, a vehicle recognition result with at least a license plate identification and a confidence level from the image recognition service. Then, by way of the corresponding image service, the detailed image appliance vehicle toll transaction method 400 sends (at 434) the vehicle recognition result (e.g., the license plate identification and the confidence level) to the storage service. The detailed image appliance vehicle toll transaction method 400 then receives (at 436), by way of the storage service, the vehicle recognition result (e.g., the license plate identification and the confidence level) from the corresponding image service, and updates (at 438), also by way of the storage service, the image record to include the vehicle recognition result (e.g., the license plate identification and the confidence level). In some embodiments, the detailed image appliance vehicle toll transaction method 400 then sends (at 440), by way of the storage service, an acknowledgment to the corresponding image service. the acknowledgment is an acknowledgment of updating the image record to include the image recognition result obtained from the image recognition service. The steps of the detailed image appliance vehicle toll transaction method 400 that involve the image recognition service are optional, as noted above. Therefore, when the detailed image appliance vehicle toll transaction method 400 is completed with the steps involving the image recognition service, or when the detailed image appliance vehicle toll transaction method 400 does not perform the optional steps involving the image recognition service, the detailed image appliance vehicle toll transaction method 400 nevertheless proceeds to the remaining steps of the method 400, as described in detail below.

In some embodiments, the detailed image appliance vehicle toll transaction method 400 sends (at 442), by way of the corresponding image service, the unique token (and, when obtained, the image recognition result including the license plate identification and the confidence level) to the image appliance. By way of the image appliance, the detailed image appliance vehicle toll transaction method 400 then correlates (at 444) the unique request ID to the unique token (and, when obtained, to the image recognition result) and sends (at 446) the unique request ID and correlated unique token (and, when available, the image recognition result including the license plate identification and the confidence level) to the toll agency system. Furthermore, the detailed image appliance vehicle toll transaction method 400 sends (at 448), by way of the image appliance, details of the unique request ID including image file size (and, when available, confidence level of image recognition result) to a billing invoice system of the image appliance vehicle toll transaction system to allow the billing invoice system to collect and aggregate data related to the unique request ID and to issue monthly invoices for payment of electronic toll amounts to an owner of the vehicle. Then the detailed image appliance vehicle toll transaction method 400 ends.

III. Network Architecture of Cloud-Based Image Appliance Vehicle Toll Transaction System In some embodiments, each of the high level image appliance vehicle toll transaction method and the detailed image appliance vehicle toll transaction method is implemented as a cloud-based image service software application that runs on an image appliance toll transaction platform hosted on a web server of a cloud-based image appliance vehicle toll transaction system that is accessed over a network by toll agency client computing devices for toll collection activities. In some embodiments, the network is a hybrid Internet-based network comprising public cloud computing resources accessed over the public Internet and private cloud computing resources accessed over private cloud networks, including encrypted and virtual private networks.

By way of example, FIG. 5 conceptually illustrates a network architecture of a cloud-based image appliance vehicle toll transaction system 500. As shown in this figure, a toll agency customer client 510 accesses services of a cloud-based image appliance vehicle toll transaction system 500. The toll agency customer client 510 demonstrates an image captured of a vehicle that passed through a toll associated with the toll agency customer client 510 (as designated by the dashed rectangle). The services of the cloud-based image appliance vehicle toll transaction system 500 are provided by way of several cloud-based image appliance and computing resources, including image appliance vehicle toll transaction cloud servers 520, a toll agency customer client database 530, an image appliance 540, an image service 550, a storage service 560, an image recognition service 570, a first persistent storage 580, a second persistent storage 590, and a billing and invoicing system 595.

The image appliance vehicle toll transaction cloud servers 520 include at least one web server that provides an interface through which the toll agency customer client 510 can access and interact with the services of a cloud-based image appliance vehicle toll transaction system 500. The toll agency customer client database 530 stores toll agency customer client account information. The image recognition service 570 shown in this figure is a third party image recognition service 570. However, in some embodiments, the image recognition service 570 is not a third party system, but is part of the image appliance vehicle toll transaction system 500. The first persistent storage 580 is communicably connected to the image appliance 540 and the second persistent storage 590 is communicably connected to the storage service 560. However, in some embodiments, the first persistent storage 580 and the second persistent storage 590 are part of a single physical or single logical database that is accessed by the image appliance 540 and the storage service 560 by way of the image service 550 or one of the image appliance vehicle toll transaction cloud servers 520.

IV. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 6 conceptually illustrates an electronic system 600 with which some embodiments of the invention are implemented. The electronic system 600 may be a computer, phone, PDA, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only 620. For example, the various memory units include instructions for processing appearance alterations of displayable characters in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 635 display images generated by the electronic system 600. The output devices 635 include printers and display devices, such as cathode ray tubes (CRT) or liquid crystal displays (LCD). Some embodiments include a touchscreen that functions as both an input and output device.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 3 and 4 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A non-transitory computer readable medium storing an image appliance vehicle toll transaction program which, when executed by a processor of a computing device, identifies a vehicle at an electronic toll and performs electronic toll collection, said image appliance vehicle toll transaction program comprising sets of instructions for:

receiving, via a toll agency system comprising an image capture device configured to capture images of vehicles approaching and passing through a toll, an image captured by the image capture device and image metadata at an image appliance that is communicably connected to an image appliance vehicle toll transaction cloud server;

sending, by the image appliance vehicle toll transaction cloud server, a unique request ID to the toll agency system, wherein the unique request ID is generated by the image appliance in connection with the image;

storing, by the image appliance, the unique request ID, the image, and the image metadata in a first persistent storage database;

forwarding, by the image appliance, the image and the image metadata to an image service;

forwarding, by the image service, the image and the image metadata to a storage service;

storing, by the storage service, the image and the image metadata in a second persistent storage database;

returning, by the image service, an image token to the image appliance;

storing, by the image appliance, the image token in the first persistent storage database along with the unique request ID, the image, and the image metadata;

providing, by the image appliance, the image token to the image appliance vehicle toll transaction cloud server; and returning, by the image appliance vehicle toll transaction cloud server on behalf of the image appliance, the image token to the toll agency system related to the unique request ID.

2. The non-transitory computer readable medium of claim 1, wherein the image appliance vehicle toll transaction program further comprises sets of instructions for collecting and aggregating, by a billing and invoicing system, the data related to the unique request ID to issue one or more monthly invoices for toll collection.

3. The non-transitory computer readable medium of claim 1, wherein the image appliance vehicle toll transaction program further comprises sets of instructions for sending, by the storage service, the image to an image recognition service.

4. The non-transitory computer readable medium of claim 3, wherein the image recognition service is a third party image recognition service.

5. The non-transitory computer readable medium of claim 3, wherein the image appliance vehicle toll transaction program further comprises sets of instructions for receiving, by the storage service, an image recognition result from the image recognition service.

6. The non-transitory computer readable medium of claim 5, wherein the set of instructions for returning, by the image service, the image token to the image appliance comprises a set of instructions for returning to the image appliance, by the image service, the image recognition result and the image token.

7. The non-transitory computer readable medium of claim 6, wherein the set of instructions for returning, by the image appliance vehicle toll transaction cloud server on behalf of the image appliance, the image token to the toll agency system related to the unique request ID comprises a set of instructions for returning, by the image appliance vehicle toll transaction cloud server on behalf of the image appliance, the image recognition result and the image token to the toll agency system related to the unique request ID.

8. The non-transitory computer readable medium of claim 5, wherein the image comprises image content of a particular vehicle as captured by the image capture device when the particular vehicle is one of approaching the toll and passing through the toll.

9. The non-transitory computer readable medium of claim 8, wherein the image content of the particular vehicle comprises a license plate of the particular vehicle.

10. The non-transitory computer readable medium of claim 9, wherein the image recognition result comprises a license plate number recognized from the license plate of the image content of the particular vehicle.

* * * * *